United States Patent
Harmon et al.

(10) Patent No.: US 11,140,811 B2
(45) Date of Patent: Oct. 12, 2021

(54) COMMODITY METERING SYSTEM FOR WORK VEHICLE WITH ROLLERS IN STAGGERED ARRANGEMENT

(71) Applicant: Deere & Company, Moline, IL (US)

(72) Inventors: Andrew W. Harmon, Davenport, IA (US); Michael E. Frasier, Iowa City, IA (US); Robert T. Casper, Davenport, IA (US); William Douglas Graham, East Moline, IL (US)

(73) Assignee: Deere & Company, Moline, IL (US)

( * ) Notice: Subject to any disclaimer, the term of this patent is extended or adjusted under 35 U.S.C. 154(b) by 484 days.

(21) Appl. No.: 16/007,358

(22) Filed: Jun. 13, 2018

(65) Prior Publication Data

US 2019/0380263 A1    Dec. 19, 2019

(51) Int. Cl.
*A01C 7/20* (2006.01)
*A01C 7/10* (2006.01)
*A01C 7/12* (2006.01)
*A01C 21/00* (2006.01)

(52) U.S. Cl.
CPC .............. *A01C 7/20* (2013.01); *A01C 7/102* (2013.01); *A01C 7/126* (2013.01); *A01C 7/206* (2013.01); *A01C 21/002* (2013.01)

(58) Field of Classification Search
CPC ......... A01C 7/081; A01C 7/082; A01C 7/084; A01C 7/085; A01C 7/10; A01C 7/102; A01C 7/105; A01C 7/107; A01C 7/12; A01C 7/121; A01C 7/122; A01C 7/123; A01C 7/124; A01C 7/125; A01C 7/126; A01C 7/127; A01C 7/128; A01C 7/163; A01C 7/206; A01C 21/002
See application file for complete search history.

(56) References Cited

U.S. PATENT DOCUMENTS

| 4,852,809 | A | * | 8/1989 | Davis ..................... A01C 15/04 239/654 |
| 5,845,818 | A | | 12/1998 | Gregor et al. |
| 8,001,915 | B2 | * | 8/2011 | Friggstad ............... A01C 7/081 111/178 |
| 8,132,521 | B2 | | 3/2012 | Snipes et al. |
| 8,434,416 | B2 | | 5/2013 | Kowalchuk et al. |
| 9,756,777 | B2 | * | 9/2017 | Chahley ................ H04L 63/062 |

(Continued)

OTHER PUBLICATIONS

Various Manufacturers, Images of Type B Distribution Systems for Seed Metering, undated, admitted prior art.
(Continued)

*Primary Examiner* — Jamie L McGowan
(74) *Attorney, Agent, or Firm* — Klintworth & Rozenblat IP LLP

(57) ABSTRACT

A work vehicle includes a commodity container and an actuator system with a plurality of actuators. The work vehicle includes a delivery system with a plurality of tubes. Furthermore, the work vehicle includes a metering system with a plurality of metering rollers that are configured to be individually actuated by respective ones of the plurality of actuators to meter out a commodity from the commodity container to respective ones of the plurality of tubes. The plurality of metering rollers are arranged substantially parallel to each other. The plurality of metering rollers are disposed in a staggered arrangement.

19 Claims, 4 Drawing Sheets

(56) References Cited

U.S. PATENT DOCUMENTS

| | | | | |
|---|---|---|---|---|
| 9,801,330 B2* | 10/2017 | Bent | ............... | A01C 7/123 |
| 9,804,608 B2 | 10/2017 | Chahley et al. | | |
| 9,924,627 B1* | 3/2018 | Beaujot | ............ | G01F 13/001 |
| 9,936,626 B2* | 4/2018 | Chahley | ............... | A01C 7/12 |
| 2007/0034721 A1* | 2/2007 | Owenby | ............ | A01C 15/122 |
| | | | | 239/656 |
| 2010/0307394 A1 | 12/2010 | Snipes et al. | | |
| 2012/0211508 A1* | 8/2012 | Barsi | ............... | A01C 7/082 |
| | | | | 221/13 |
| 2013/0192503 A1 | 8/2013 | Henry et al. | | |
| 2014/0076218 A1 | 3/2014 | Liu | | |
| 2014/0261117 A1 | 9/2014 | Gray et al. | | |
| 2014/0261810 A1* | 9/2014 | Bent | ............... | A01C 7/081 |
| | | | | 137/625.11 |
| 2015/0166269 A1* | 6/2015 | Roberge | ............ | B65G 53/40 |
| | | | | 406/108 |
| 2015/0181800 A1* | 7/2015 | Glowa | ............... | A01C 7/04 |
| | | | | 111/200 |
| 2015/0216109 A1 | 8/2015 | Meyer et al. | | |
| 2017/0055436 A1 | 3/2017 | Thompson et al. | | |
| 2017/0273235 A1 | 9/2017 | Kordick | | |
| 2019/0037764 A1* | 2/2019 | Garner | ............ | A01C 7/123 |
| 2019/0380263 A1* | 12/2019 | Harmon | ............ | A01C 7/126 |
| 2019/0387666 A1* | 12/2019 | Harmon | ............ | A01C 7/081 |

OTHER PUBLICATIONS

European Search Report for European Patent Application No. EP 19172404.6 dated Oct. 29, 2019 in 11 pages.

* cited by examiner

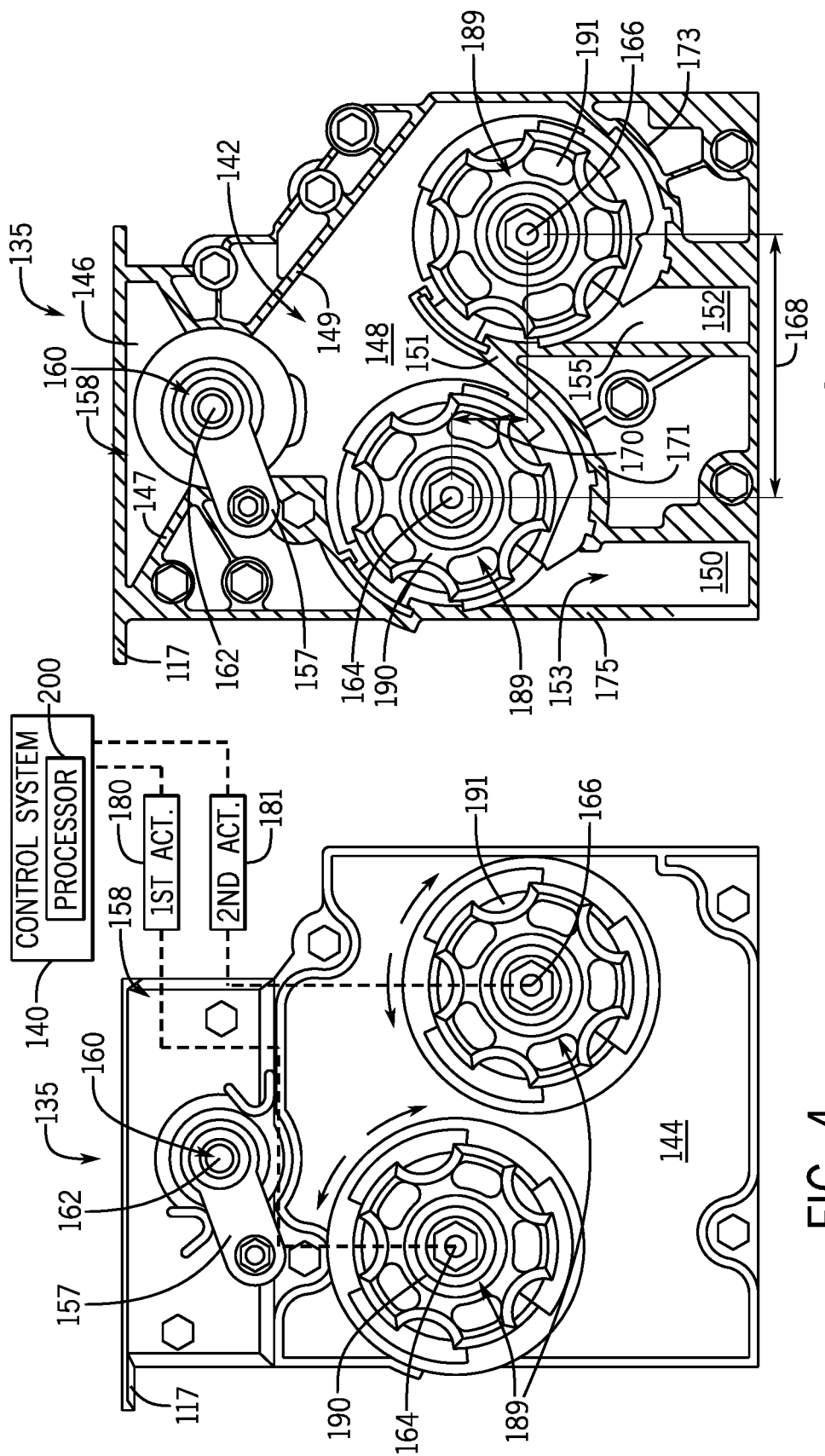

COMMODITY METERING SYSTEM FOR WORK VEHICLE WITH ROLLERS IN STAGGERED ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity metering system for a work vehicle with metering rollers that are disposed in a staggered arrangement.

BACKGROUND OF THE DISCLOSURE

Seeding work vehicles, such as air carts/seeders and other seeding devices, are configured for applying seed, fertilizer, and/or other particulate commodities to a field. The work vehicle may be operatively connected to tilling equipment for applying the commodity under the surface of the soil.

Seeding work vehicles typically include one or more tanks and a metering system that meters out a predetermined quantity of the commodity from the tank as the work vehicle moves across the field. The metering system may include a plurality of metering elements, such as metering rollers that are configured to meter out the commodity from the tank.

It may be desirable to increase the number of metering rollers to thereby increase the amount of commodity that is delivered to the soil in a single pass of the work vehicle. However, there may be space constraints that limit the number of metering rollers that can be included on the work vehicle.

SUMMARY OF THE DISCLOSURE

This disclosure provides an improved commodity metering system and/or delivery system for a work vehicle. This disclosure also provides methods for operating the same.

In one aspect, the disclosure provides a work vehicle having a commodity container and an actuator system with a plurality of actuators. The work vehicle includes a delivery system with a plurality of tubes. Furthermore, the work vehicle includes a metering system with a plurality of metering rollers that are configured to be individually actuated by respective ones of the plurality of actuators to meter out a commodity from the commodity container to respective ones of the plurality of tubes. The plurality of metering rollers are arranged substantially parallel to each other. The plurality of metering rollers are staggered in a vertical direction and staggered in a horizontal direction.

In another aspect, a work vehicle is disclosed that includes a commodity container and an actuator system with a first actuator and a second actuator. The work vehicle includes a delivery system with at least one tube a metering system with at least one metering unit. The metering unit includes a housing, a passage defined through the housing and configured to receive a commodity from the commodity container, and a first metering roller and a second metering roller at least partly disposed within the passage of the housing. The first metering roller is configured to be driven in rotation by the first actuator for metering the commodity through the passage to the delivery system. The second metering roller is configured to be driven in rotation by the second actuator for metering the commodity through the passage to the delivery system.

In an additional aspect, the disclosure provides a work vehicle with a commodity container and a metering system with a plurality of metering rollers arranged in a first row and a second row. The first row is spaced apart at a vertical distance from the second row. The first row is offset horizontally with respect to the second row. The work vehicle also includes an actuator system with a plurality of actuators configured to individually actuate respective ones of the plurality of metering rollers. Moreover, the work vehicle includes a delivery system with a plurality of tubes, each configured to receive a commodity metered from the commodity container by respective ones of the plurality of metering rollers. The plurality of tubes are arranged in a third row and a fourth row. The third row is spaced apart at a vertical distance from the fourth row, and the third row is offset horizontally with respect to the fourth row. The plurality of tubes are substantially parallel to the plurality of metering rollers.

The details of one or more embodiments are set forth in the accompanying drawings and the description below. Other features and advantages will become apparent from the description, the drawings, and the claims.

BRIEF DESCRIPTION OF THE DRAWINGS

FIG. 4 is an end view of a metering unit of the metering system of FIG. 2; and

FIG. 5 is a section view of the metering unit of FIG. 4.

Like reference symbols in the various drawings indicate like elements.

DETAILED DESCRIPTION

Figure 1:
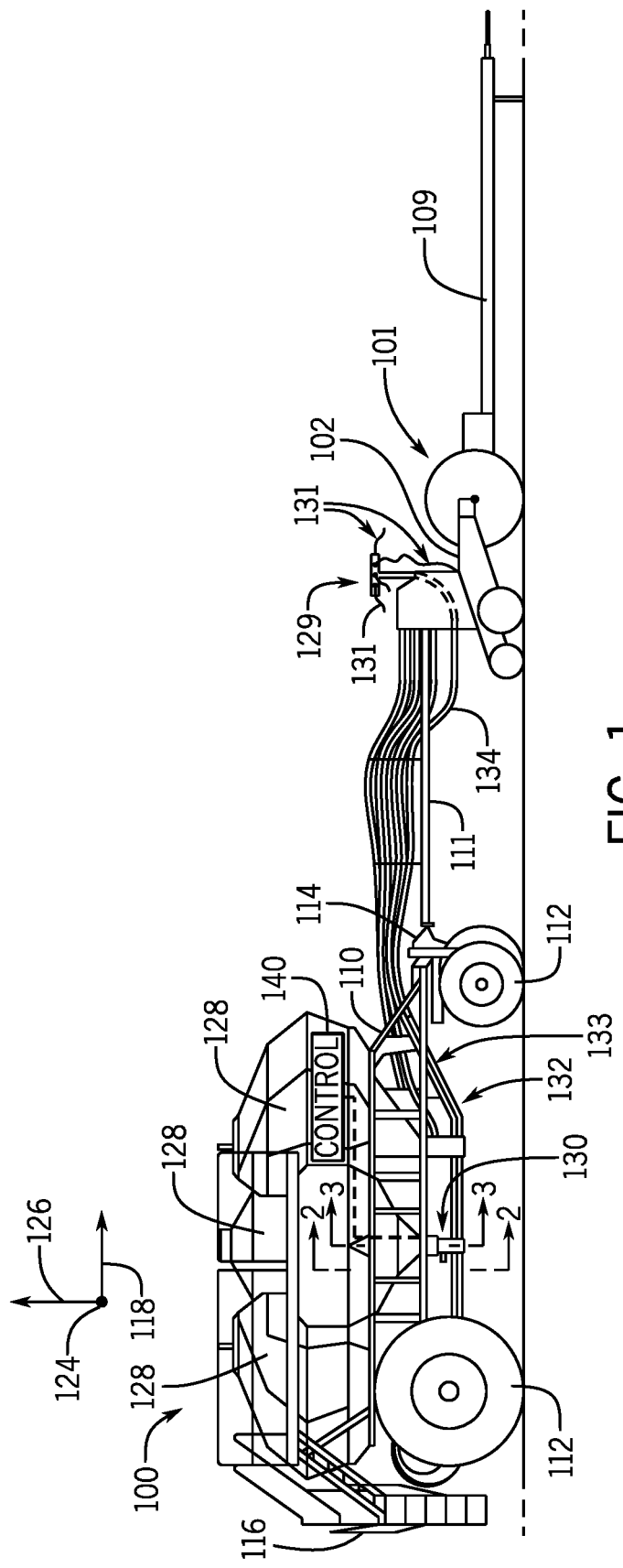
FIG. 1 is a side view of a work vehicle according to example embodiments of the present disclosure.

The following describes one or more example embodiments of a commodity metering system for a work vehicle (e.g., an air cart, commodity cart, etc.), its control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed work vehicle for metering and delivering a commodity to the soil, as shown in the accompanying figures of the drawings described briefly above. The work vehicle may include a metering system with a plurality of metering elements. The metering elements may comprise metering rollers in some embodiments. The metering rollers may actuate (rotate) independent of each other and at variable output speeds in some embodiments. The work vehicle may also include a control system configured to control the actuation of the metering rollers individually and independently.

The metering rollers may be spaced apart and arranged substantially parallel to each other. In some embodiments, the rollers may be substantially parallel to the primary axis of the work vehicle (i.e., parallel to the direction of travel). Also, in some embodiments, the rollers may be disposed in a staggered arrangement. The rollers may be staggered vertically and horizontally in some embodiments. For example, the rollers may be arranged into rows that are spaced apart vertically and that are offset horizontally.

The work vehicle may also include a delivery system with a plurality of tubes. Air may move through the tubes. The tubes may receive commodity that is metered out from the metering rollers, and the commodity may travel along the tubes within the airstream toward a row unit for planting in the soil. At least part of the tubes may be arranged substantially parallel to each other (e.g., parallel to the primary axis of the work vehicle) and substantially parallel to the metering rollers. In some embodiments, the tubes of the delivery system may be disposed in a staggered arrangement. The tubes may be staggered vertically and horizontally in some embodiments. For example, a part of the tubes may be arranged into rows that are spaced apart vertically and that are offset horizontally.

Furthermore, at least two of the metering rollers may be housed in a common housing. The housing may define an inlet that receives the commodity from a commodity container. The housing may also define a plurality of outlets. Commodity that enters the housing through the inlet may be metered by the metering rollers and provided to respective ones of the outlets. The outlets may provide the metered commodity to respective ones of the tubes of the delivery system. Then, the tubes may deliver the commodity to the row units for planting in the soil.

Accordingly, the work vehicle may provide the commodity to the soil in a controlled and accurate manner. Furthermore, the arrangement of the metering rollers and/or the tubes of the delivery system may be compact and well-organized.

FIG. 1 illustrates a work vehicle 100 according to example embodiments of the present disclosure. In the illustrated embodiment, the work vehicle 100 may be towed by another vehicle, such as a tractor (not shown). In other embodiments, the work vehicle 100 of the present disclosure may be a self-propelled vehicle. In some embodiments, the work vehicle 100 may be an air cart or air drill that contains a bulk amount of a commodity, that meters out the commodity from the bulk amount, and that moves the metered commodity away from the work vehicle 100 for planting in the ground. The work vehicle 100 shown in FIG. 1 is merely an example embodiment of the present disclosure. One or more features of the present disclosure may be included on a different work vehicle, such as a planter, a commodity cart, or other work vehicle without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together by a row unit frame 102 that extends substantially along the lateral axis 124. There may be a plurality of row units 101 spaced apart and arranged in series on the row unit frame 102 along the lateral axis 124. Thus, although only one row unit 101 is shown in FIG. 1, it will be appreciated that similar row units 101 may be included and disposed in series along the lateral axis 124. The row unit frame 102 may be connected to the work vehicle 100 via a rear tow bar 111. The row unit frame 102 may also be connected to the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected to the work vehicle 100 (i.e., directly connected to the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row unit frame 102.

The work vehicle 100 may further include one or more commodity containers 128 (tanks, vessels, etc.). The containers 128 may be supported on the frame 110. The commodity containers 128 may contain seed, fertilizer, and/or another particulate or granular commodity. There may be any number of containers 128. In the illustrated embodiment, for example, there are three commodity containers 128.

Figure 2:
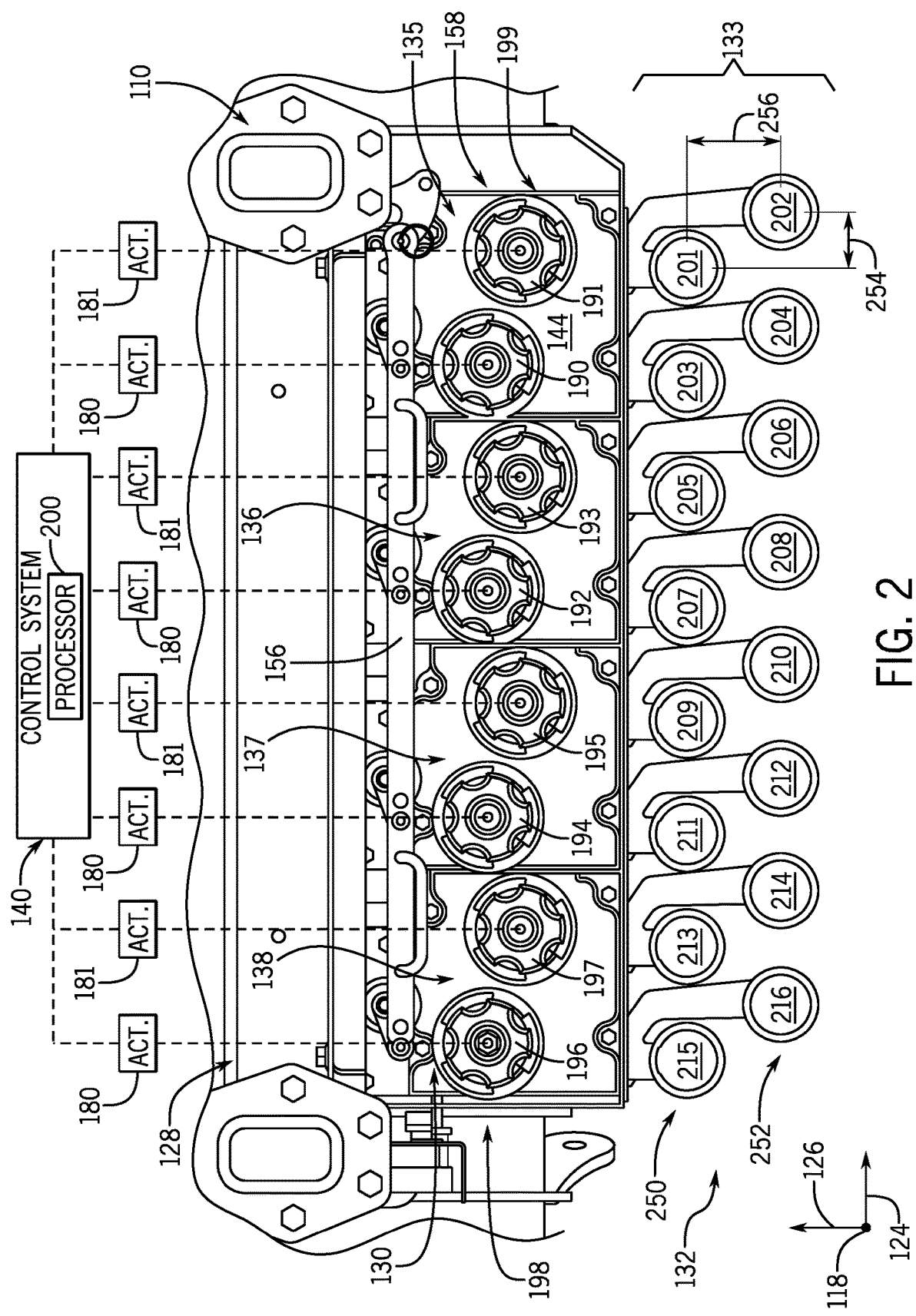
FIG. 2 is a section view of a metering system and a delivery system of the work vehicle taken along the line 2-2 of FIG. 1 according to example embodiments.
Figure 3:
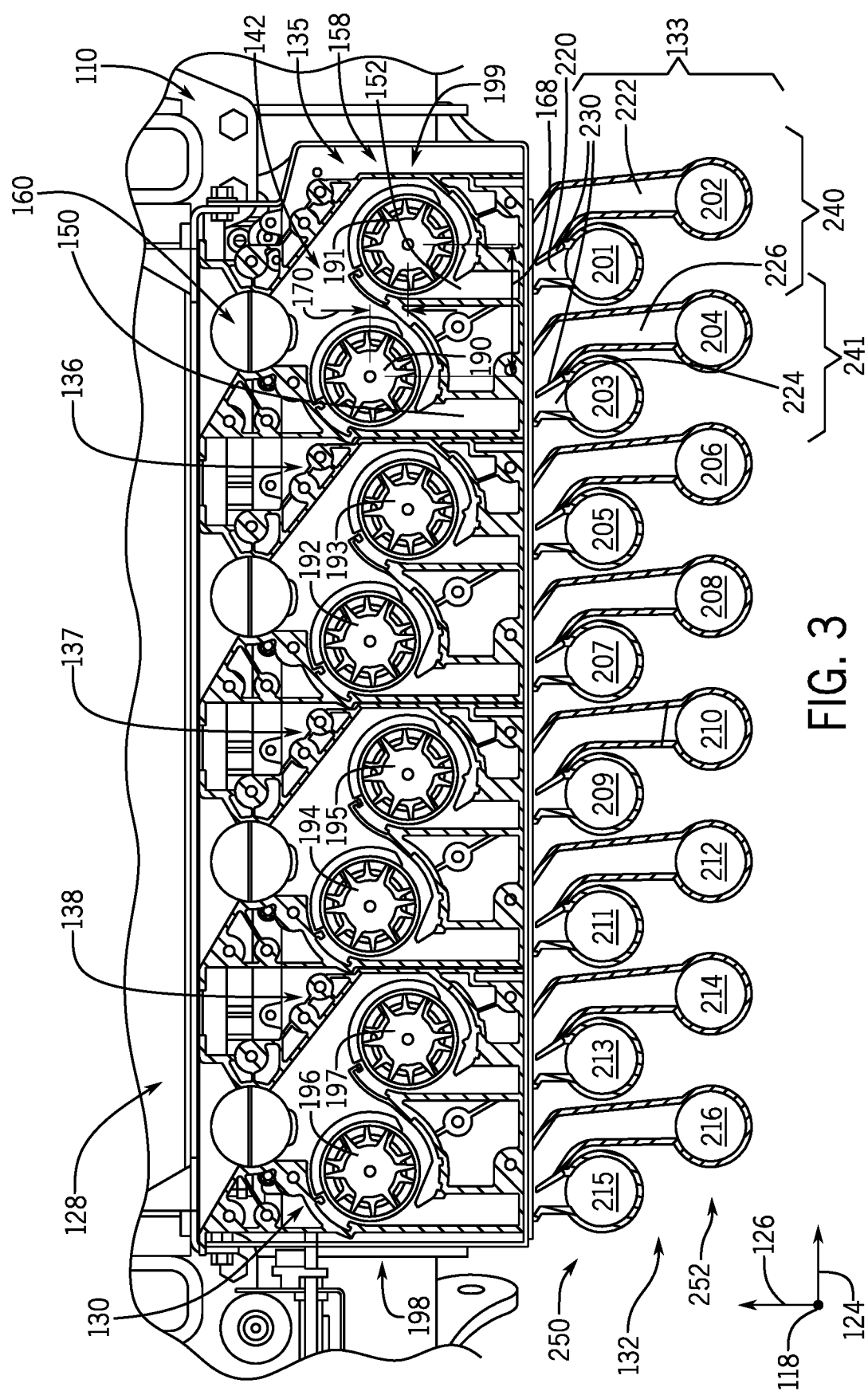
FIG. 3 is a section view of the metering system and the delivery system of the work vehicle taken along the line 3-3 of FIG. 1 according to example embodiments.

Additionally, the work vehicle 100 may include at least one metering system 130. The metering system 130 may be a volumetric metering system. The metering system 130 may be configured to receive commodity from the commodity container 128 and may meter commodity to a downstream component. In some embodiments, the metering system 130 may be supported by the frame 110 and may be disposed generally underneath the commodity container(s) 128. The work vehicle 100 may include individual metering systems 130 for different commodity containers 128 in some embodiments. One representative metering system 130 is shown in FIGS. 2 and 3 according to example embodiments. During operation, particles of the commodity within one of the containers 128 may move vertically downward toward the metering system 130. The metering system 130 may operate to meter out the commodity from the container 128 at a controlled rate as the vehicle 100 moves across the field.

The work vehicle 100 may also include a delivery system 132. The delivery system 132 may include a plurality of delivery tubes 133 (i.e., lines, pipes, etc.). The tubes 133 may include rigid segments as well as flexible segments. The tubes 133 may be supported by the frame 110 and may extend from the work vehicle 100 substantially along the longitudinal axis 118. The tubes 133 may conduct a flow of air from the rear end 116 to the front end 114 and away from the work vehicle 100. Airflow within the tubes 133 may be generated by a fan or other source mounted on the vehicle 100. The tubes 133 may be fluidly connected to the metering system 130 such that particles of the commodity (metered out by the metering system 130) may be received by the tubes 133. In some embodiments, the particles may move vertically downward into the tubes 133. Once in the tubes 133, the air stream therein may propel the metered particles away from the work vehicle 100 and toward the row units 101.

The tubes 133 may also be attached to and in fluid communication with a downstream manifold 129. In some embodiments, the manifold 129 may be supported by the row unit frame 102 (i.e., remote from the work vehicle 100), although it will be appreciated that the manifold 129 may be supported directly on the frame 110 of the work vehicle 100 or other location. As shown in FIG. 1, a first tube 134 of the plurality of plurality of tubes 133 may be connected to the manifold 129, and the manifold 129 may be connected to a plurality of different branch lines 131, which extend to different row units 101 along the lateral axis 124. Thus, commodity delivered by the first tube 134 from the work vehicle 100 may be directed between a plurality of different row units 101 for delivery to the soil.

Moreover, the work vehicle 100 may include a control system 140. The control system 140 may include and/or communicate with various components of a computerized device, such as a processor, a data storage device, a user interface, etc. The control system 140 may be in communication with and may be configured for controlling the metering system 130, the delivery system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the delivery system 132, etc.

During operation of the work vehicle 100 (e.g., when towed by a tractor or other towing vehicle), the control system 140 may control the metering system 130 (e.g., by controlled actuation of one or more motors or other actuators), which allows a controlled quantity of particles to pass into the delivery system 132 at a predetermined rate. The metered commodity may flow through the delivery system 132 to the manifold 129, which may distribute the commodity to the different row units 101 for planting the commodity within different rows in the soil.

Referring now to FIGS. 2-5, the metering system 130, the delivery system 132, and the control system 140 will be discussed in greater detail according to example embodiments. It will be appreciated that certain parts of the work vehicle 100 are hidden for clarity.

The metering system 130 may include a plurality of metering units. In the illustrated embodiment, there is a first metering unit 135, a second metering unit 136, a third metering unit 137, and a fourth metering unit 138. The metering units 135, 136, 137, 138 may be removably and replaceably supported by the frame 110 of the work vehicle 100. In some embodiments, the work vehicle 100 may have different configurations, wherein the number of metering units, the spacing between metering units, the arrangement of the metering units, etc. is different in each configuration. Thus, it will be appreciated that the illustrated configuration (having four, evenly spaced metering units 135, 136, 137, 138) is merely one example. Other example configurations of the work vehicle 100 may include a single metering unit. Additional example configurations may include five or more metering units.

The first metering unit 135 is shown isolated in FIGS. 4 and 5 as a representative example. It will be appreciated that the second, third, and fourth metering units 136, 137, 138 may be substantially similar.

The metering unit 135 may include a housing 158. The housing 158 may include a plurality of rigid walls that are arranged to define an interior passage 142. (In FIGS. 2 and 4, a cover 144 of the housing 158 is included that hides the passage 142; however, in FIGS. 3 and 5, the cover 144 is not shown such that the passage 142 is revealed.) The passage 142 may be defined through the housing 158 and may be configured to receive commodity from the commodity container 128.

As shown in FIGS. 4 and 5, the housing 158 may include a flange 117 that is disposed at an upper region of the housing 158. As will be discussed, flange 117 may interconnect the metering unit 135 with other metering units, may facilitate installation of the metering unit 135 on the work vehicle 100, and/or may ensure that the metering unit 135 is oriented correctly when installed.

As shown in FIG. 5, the passage 142 may include an inlet 146, an intermediate section 148, and a plurality of outlets 150, 152. The outlets may include a first outlet 150 and a second outlet 152; however, it will be appreciated that there may be any number of outlets.

The inlet 146 may be defined by a funnel-shaped inlet wall 147. The inlet 146 of the passage 142 may be in communication with the commodity container 128 to receive commodity therefrom.

The intermediate section 148 may be defined by an intermediate wall 149. At least a portion of the intermediate wall 149 may taper outward from the inlet 146. The intermediate wall 149 may also include a divider structure 151, which divides the intermediate section 148 of the passage 142 into a first branch 153 and a second branch 155. The first branch 153 may be in communication with the first outlet 150 and the second branch 155 may be in communication with the second outlet 152.

The metering unit 135 may additionally include a shut off valve 160. The shut off valve 160 may be a rotational valve that is supported for rotation about an axis 162. The shut off valve 160 may be moveably attached to the housing 158 and disposed proximate a transition between the inlet 146 and the intermediate section 148 of the passage 142. The rotational axis 162 of the shut off valve 160 may extend substantially parallel to the longitudinal axis 118 of the work vehicle 100 in some embodiments. The shut off valve 160 may rotate about the axis 162 between a first, open and second, closed position. In the open position, commodity within the inlet 146 may move into the intermediate section 148 of the passage 142. In the closed position, the shut off valve 160 may prevent movement of the commodity from the inlet 146 to the intermediate section 148. As shown in FIGS. 4 and 5, the shut off valve 160 may include an arm 157. The arm 157 may be disposed on an axial end of the valve 160 and may extend radially away from the axis 162. Rotation of the arm 157 about the axis 162 may move the shut off valve 160 between the open and closed positions. Also, as shown in FIG. 2, the metering system 130 may include a shut off coupling member 156. The coupling member 156 may be a rigid bar that is fixed to the arms 157 of the different shut off valves 160. Accordingly, moving the coupling member 156 may simultaneously move the connected shut off valves 160 between the open position and the closed position.

Furthermore, the metering unit 135 may include a plurality of metering elements 189. There may be any number of metering elements 189. As shown in the embodiment of FIGS. 4 and 5, for example, the plurality of metering elements 189 may include a first metering roller 190 and a second metering roller 191. However, it will be appreciated that the metering elements 189 may include any number of rollers.

The first and second metering rollers 190, 191 may be substantially similar. Both the first and second metering rollers 190, 191 may be substantially cylindrical. In some embodiments, the metering rollers 190, 191 may include a plurality of projections that project radially such that the metering rollers 190, 191 are fluted. The metering rollers 190, 191 may also be configured as an auger or configured otherwise in some embodiments of the present disclosure.

The first and second metering rollers 190, 191 may be moveably attached to the housing 158 and supported for rotation within the interior passage 142 about respective axes. Specifically, the first metering roller 190 may be supported for rotation about a first axis of rotation 164, and the second metering roller 191 may be supported for rotation about a second axis of rotation 166. The first and second metering rollers 190, 191 may be disposed within the intermediate section 148 of the metering unit 135 with the divider structure 151 disposed between the first and second metering rollers 190, 191. Also, the housing 158 may include a first cradle 171 that is rounded and that partially receives an underside of the first metering roller 190. Likewise, the housing 158 may include a second cradle 173 that is rounded and that partially receives an underside of the second metering roller 191. The first metering roller 190 may also be disposed within the passage 142, between the intermediate section 148 and the first outlet 150. Specifically, the first outlet 150 may be defined between the first cradle 171 and an outer wall 175 of the housing 158. The second metering roller 191 may be disposed within the passage 142, between the intermediate section 148 and the second outlet 152. Specifically, the second outlet 152 may be defined between the second cradle 173 and the divider structure 151.

Additionally, the first and second metering rollers 190, 191 may be disposed within the passage 142, downstream of the shut off valve 160. As such, moving the shut off valve 160 to the closed position may cut off the supply of the commodity from the commodity container 128 from moving toward the rollers 190, 191. Conversely, moving the shut off valve 160 to the open position may allow the commodity to move from the commodity container 128 toward the first and second metering rollers 190, 191.

The axes 164, 166 of the metering rollers 190, 191 may be substantially parallel to each other. Also, in some embodiments, the first and second axes 164, 166 may be parallel to the longitudinal axis 118 (i.e., parallel to the primary axis of the work vehicle 100 and the travel direction). The axes 164, 166 may be spaced apart at a horizontal distance 168 in some embodiments. Also, the axes 164, 166 may be spaced apart at a vertical distance 170 in some embodiments.

The first and second metering rollers 190, 191 may rotate to provide volumetric metering of the commodity within the intermediate section 148 of the passage 142. During operation, particles of commodity may move from the container 128 toward the metering rollers 190, 191. A first portion of the commodity within the intermediate section 148 may be divided from a second portion of the commodity, for example, by the divider structure 151. The first metering roller 190 may rotate to meter the first portion of the commodity from the intermediate section 148 to the first outlet 150. The second metering roller 191 may rotate to meter the second portion of the commodity from the intermediate section 148 to the second outlet 152. Accordingly, controlled amounts of the commodity may be output from the first and second outlets 150, 152 toward the delivery system 132.

As shown in FIG. 4, the metering system 130 may also include a plurality of actuators, such as a first actuator 180 and a second actuator 181. The actuators 180, 181 may be of any suitable type, such as electric motors in some embodiments. However, it will be appreciated that the actuators may be a hydraulic actuators or other types without departing from the scope of the present disclosure. In some embodiments, the metering rollers 190, 191 may include respective and independent actuators 180, 181. In other words, the first actuator 180 may be operatively connected to the first metering roller 190 for drivingly rotating the first metering roller 190 about the axis of rotation 164, and the second actuator 181 may be operatively connected to the second metering roller 191 for drivingly rotating the second metering roller 191 about the axis of rotation 166. As such, the metering rollers 190, 191 may be individually and independently actuated relative to the other. In some operating situations, the metering rollers 190, 191 may operate simultaneously, but at different individual speeds. In other situations, one of the metering rollers 190, 191 may operate while the other is stationary.

The actuators 180, 181 may be operatively connected to the control system 140. The control system 140 may include a processor 200. The processor 200 may comprise hardware, software, and/or firmware components configured to enable communications and/or interaction with the actuators 180, 181. The control system 140 may also include a memory element (e.g., RAM memory, flash memory, EPROM memory, EEPROM memory, registers, a hard disk, a removable disk, a CD-ROM, or any other form of storage medium known in the art). In this regard, the memory element can be coupled to the processor 200 such that the processor 200 can read information from, and write information to, the memory element. In the alternative, the memory element may be integral to the processor 200. As an example, the processor 200 and the memory element may reside in an ASIC. The control system 140 may further include a user interface (U/I) with buttons, dials, displays, speakers, and/or other components which a user may manually input commands and/or receive output. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

During operation, the processor 200 may receive one or more input signals from one or more sensors. The input signals may relate to a variable condition detected by the sensor(s) (e.g., the ground speed of the work vehicle 100, the turn radius of the work vehicle 100 as it turns within the field, etc.). The processor 200 may rely on the input signals as well as predetermined computer logic to generate and output control commands for the first and second actuators 180, 181. Thus, as the ground speed of the vehicle 100 changes, the actuators 180, 181 may change the angular speed of the metering rollers 190, 191 accordingly. Likewise, as the work vehicle 100 turns within the field, the control system 140 may rotate the metering roller 190 faster than the second metering roller 191 or vice versa to accommodate for the turn. It will be appreciated that the control system 140 may independently control the actuators 180, 181 in additional ways as well without departing from the scope of the present disclosure.

As shown in FIGS. 2 and 3, the first metering unit 135 may be arranged on the work vehicle 100 in a horizontal row or series with the second metering unit 136, the third metering unit 137, and the fourth metering unit 138. The housings 158 of the metering units 135, 136, 137, 138 may be arranged in a row that extends horizontally and substantially parallel to the lateral axis 124. The housing 158 of one of the units 135, 136, 137, 138 may abut against a neighboring housing 158 in this arrangement and may be interconnected therewith. In some embodiments, the flange 117 of one metering unit may be connected to a neighboring metering unit and/or surrounding support structure.

In this arrangement, the housings 158 may be configured to receive commodity from a common source (i.e., the same commodity container 128). Also, the housings 158 may collectively house the plurality of metering rollers of the metering system 130. In the embodiment of FIGS. 2 and 3, for example, the housing 158 of the first metering unit 135 may house a roller group consisting of the first and second metering rollers 190, 191. Similarly, the housing 158 of the second metering unit 136 may house a group consisting of the third metering roller 192 and a fourth metering roller 193. Likewise, the housing 158 of the third metering unit 137 may house a group consisting of the fifth metering roller 194 and a sixth metering roller 195. Additionally, the housing 158 of the fourth metering unit 138 may house a group consisting of a seventh metering roller 196 and an eighth metering roller 197.

Furthermore, in some embodiments, the first, third, fifth, and seventh metering rollers 190, 192, 194, 196 may be aligned and arranged in a horizontally-extending upper row 198. Stated differently, the axes of rotation of these rollers 190, 192, 194, 196 may be aligned along the lateral axis 124. Additionally, the second, fourth, sixth, and eighth metering roller 191, 193, 195, 197 may be aligned and arranged in a horizontally-extending lower row 199. The upper row 198 may be offset from vertical alignment with the lower row 199 (i.e., staggered and spaced apart) at a distance equal to the horizontal distance 168. Also, the upper row 198 may be offset from horizontal alignment with the lower row 199 (i.e., staggered and spaced apart) at a distance equal to the vertical distance 170.

FIGS. 2 and 3 illustrate the delivery system 132 according to example embodiments. As stated above, the delivery system 132 may include a plurality of tubes 133. In some embodiments, the plurality of tubes 133 may include a first tube 201, a second tube 202, a third tube 203, a fourth tube 204, a fifth tube 205, a sixth tube 206, a seventh tube 207, an eighth tube 208, a ninth tube 209, a tenth tube 210, an eleventh tube 211, a twelfth tube 212, a thirteenth tube 213, a fourteenth tube 214, a fifteenth tube 215, and a sixteenth tube 216. As shown, each of these tubes 201-216 may include a segment that is fixed to the frame 110 of the work vehicle 100 below the metering system 130. The longitudinal axis of these segments of the tubes 201-216 may be substantially parallel to each other and may be substantially parallel to longitudinal axis 118. As such, in some embodiments, the tubes 201-216 may be substantially parallel to the metering rollers 190-197.

The tubes 201-216 may also be fluidly connected (in fluid communication) with the metering system 130. For example, a first chute 220 may connect the first tube 201 to the second outlet 152 of the first metering unit 135, and a second chute 222 may connect the second tube 202 to the second outlet 152 as well. In some embodiments, the delivery system 132 may include a valve 230 that may be disposed within the first chute 220 and/or the second chute 222 and that may move to control flow of the commodity therethrough. For example, in some embodiments, the valve 230 may be a flap that is rotationally supported at a branch between the first and second chute 220, 222. The valve 230 may rotate to open and shut the chutes 220, 222 to control flow.

A third chute 224 may connect the third tube 203 to the first outlet 150 of the first metering unit 135, and a fourth chute 226 may connect the fourth tube 204 to the first outlet 150 as well. The third chute 224 and the fourth chute 226 may include a respective valve 230 as well. Furthermore, the remaining tubes 205-216 may be similarly connected to the second, third, and fourth metering units 136, 137, 138.

Accordingly, the tubes 201-216 may be organized into groups. Each group of tubes 201-216 may be configured to receive commodity metered out from a single one of the plurality of metering rollers 190-197. For example, as shown in FIG. 3, the first tube 201 and the second tube 202 may be paired together in such a group 240 and may receive commodity metered out from the second metering roller 191. Similarly, the third tube 203 and fourth tube 204 may be paired into a group 241 and may receive commodity metered out from the first metering roller 190. The remaining tubes 205-216 may be similarly paired into groups as well.

As mentioned above, once the commodity is metered into the delivery system 132, the tubes 201-216 may propel the commodity away from the work vehicle 100. For example, commodity from the second metering roller 191 may move into the first tube 201. Then, the commodity in the first tube 201 may be propelled toward the manifold 129 (FIG. 1), which may split this amount of commodity between the branch lines 131 for delivery to the different row units 101. On the other hand, commodity from the second metering roller 191 may also move into the second tube 202, and this amount may move to a different manifold 129 for delivery to a different group of row units 101. Likewise, the other tubes 203-216 may move commodity to different manifolds 129 for delivery to the remaining row units 101.

It will be appreciated, however, that commodity delivery to the tubes 201-216 may be cut off in various ways. For example, the valves 230 may be moved to cut off flow to respective tubes 201-216. Also, the shut off valves 160 may be moved to cut off flow further upstream as discussed above. Additionally, the control system 140 may turn off the actuators 180, 181 to cut off supply of the commodity as discussed above.

The plurality of tubes 201-216 of the delivery system 132 may be arranged in a compact manner. For example, the first, third, fifth, seventh, ninth, eleventh, thirteenth, and fifteenth tube 201, 203, 205, 207, 209, 211, 213, 215 may be aligned and arranged in a horizontally-extending upper row 250. Additionally, the second, fourth, sixth, eighth, tenth, twelfth, fourteenth, and sixteenth tube 202, 204, 206, 208, 210, 212, 214, 216 may be aligned and arranged in a horizontally-extending lower row 252. The upper row 250 may be offset from vertical alignment with the lower row 252 (i.e., staggered and spaced apart) at a distance equal to a horizontal distance 254. Moreover, the upper row 250 may be offset from horizontal alignment with the lower row 252 (i.e., staggered and spaced apart) at a distance equal to a vertical distance 256.

In summary, the metering system 130 and delivery system 132 may be compact and well-organized despite the large number of components and given the limited amount of space. Accordingly, the work vehicle 100 may deliver a controlled amount of commodity to a large number of row units 101 for efficient planting operations.

Also, the following examples are provided, which are numbered for easier reference.

1. A work vehicle comprising: a commodity container; an actuator system with a plurality of actuators; a delivery system with a plurality of tubes; and a metering system with a plurality of metering rollers that are configured to be individually actuated by respective ones of the plurality of actuators to meter out a commodity from the commodity container to respective ones of the plurality of tubes, the plurality of metering rollers arranged substantially parallel to each other, the plurality of metering rollers being staggered in a vertical direction and staggered in a horizontal direction.

2. The work vehicle of example 1, wherein the metering rollers are arranged in a first row and a second row, the first row being spaced apart at a vertical distance from the second row, the first row being offset horizontally with respect to the second row.

3. The work vehicle of example 1, wherein at least one of the plurality of tubes is operatively connected to a downstream manifold, the downstream manifold configured to direct the commodity between a plurality of row units for delivery to ground.

4. The work vehicle of example 1, wherein the plurality of tubes includes at least one group of tubes each configured to receive commodity metered out from a single one of the plurality of metering rollers.

5. The work vehicle of example 1, wherein the plurality of tubes are arranged substantially parallel to each other, the plurality of tubes being staggered in the vertical direction and staggered in the horizontal direction.

6. The work vehicle of example 5, wherein the plurality of tubes are arranged substantially parallel to the plurality of metering rollers.

7. The work vehicle of example 1, further comprising a frame that supports the metering system; and further comprising a housing that houses a group of the plurality of metering rollers; wherein the housing is removably attached to the frame.

8. The work vehicle of example 7, wherein the housing is one of a plurality of housings the house different groups of the plurality of metering rollers; wherein the plurality of housings are arranged in a row that extends in the horizontal direction; and wherein the group includes a first roller and a second roller that are spaced apart at a vertical distance; and wherein the first roller and the second roller are spaced apart at a horizontal distance.

9. The work vehicle of example 8, wherein at least one of the plurality of housings includes an interior, the first and second rollers being supported for rotation within the interior; further comprising a shut-off valve that is disposed within the interior, the shut-off valve having a first position and a second position; the shut-off valve, in the first position, configured to prevent the commodity from moving from the commodity container to the first and second metering rollers; and the shut-off valve, in the second position, configured to allow the commodity to move from the commodity container to the first and second metering rollers.

10. The work vehicle of example 9, wherein the first roller is configured to rotate about a first axis of rotation to meter out the commodity from the commodity container; wherein the second roller is configured to rotate about a second axis of rotation to meter out the commodity from the commodity container; wherein the shut-off valve is configured to rotate about a third axis of rotation when moving between the first position and the second position; and wherein the first, second and third axes of rotation are substantially parallel.

11. The work vehicle of example 1, further comprising a control system configured to generate control signals for the plurality of actuators to selectively actuate individual ones of the plurality of metering rollers.

12. A work vehicle comprising: a commodity container; an actuator system with a first actuator and a second actuator; a delivery system with at least one tube; and a metering system with at least one metering unit that includes a housing, a passage defined through the housing and configured to receive a commodity from the commodity container, and a first metering roller and a second metering roller at least partly disposed within the passage of the housing, the first metering roller configured to be driven in rotation by the first actuator for metering the commodity through the passage to the delivery system, the second metering roller configured to be driven in rotation by the second actuator for metering the commodity through the passage to the delivery system.

13. The work vehicle of example 12, wherein the first metering roller and the second metering roller are offset in a horizontal direction and in a vertical direction.

14. The work vehicle of example 12, wherein the first metering roller, the second metering roller, and the at least one tube are substantially parallel.

15. The work vehicle of example 12, wherein the at least one tube includes a first tube and a second tube; wherein the passage of the housing includes an inlet configured to receive the commodity from the commodity container for metering by the first metering roller and the second metering roller; wherein the passage includes a first outlet configured to pass the commodity metered by the first metering roller to the first tube; and wherein the passage includes a second outlet configured to pass the commodity metered by the second metering roller to the second tube.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
   a commodity container;
   an actuator system with a plurality of actuators;
   a delivery system with a plurality of tubes; and
   a metering system with a plurality of metering rollers that are configured to be individually actuated by respective ones of the plurality of actuators to meter out a commodity from the commodity container to respective ones of the plurality of tubes, the plurality of metering rollers having axes of rotation arranged spaced apart and substantially parallel to each other along a lateral axis, the plurality of metering rollers being arranged so that the axes of rotation are staggered in a vertical direction and in a horizontal direction.

2. The work vehicle of claim 1, wherein the metering rollers are arranged in a first row and a second row, the first row being spaced apart at a vertical distance from the second row, the first row being offset horizontally with respect to the second row.

3. The work vehicle of claim 1, wherein at least one of the plurality of tubes is operatively connected to a downstream manifold, the downstream manifold configured to direct the commodity between a plurality of row units for delivery to ground.

4. The work vehicle of claim 1, wherein the plurality of tubes includes at least one group of tubes each configured to receive commodity metered out from a single one of the plurality of metering rollers.

5. The work vehicle of claim 1, wherein the plurality of tubes are arranged substantially parallel to each other, the plurality of tubes being staggered in the vertical direction and staggered in the horizontal direction.

6. The work vehicle of claim 5, wherein the plurality of tubes are arranged substantially parallel to the plurality of metering rollers.

7. The work vehicle of claim 1, further comprising a frame that supports the metering system; and
   further comprising a housing that houses a group of the plurality of metering rollers;
   wherein the housing is removably attached to the frame.

8. The work vehicle of claim 7, wherein the housing is one of a plurality of housings the house different groups of the plurality of metering rollers;
   wherein the plurality of housings are arranged in a row that extends in the horizontal direction; and
   wherein the group includes a first roller and a second roller that are spaced apart at a vertical distance; and
   wherein the first roller and the second roller are spaced apart at a horizontal distance.

9. The work vehicle of claim 8, wherein at least one of the plurality of housings includes an interior, the first and second rollers being supported for rotation within the interior;
   further comprising a shut-off valve that is disposed within the interior, the shut-off valve having a first position and a second position;
   the shut-off valve, in the first position, configured to prevent the commodity from moving from the commodity container to the first and second metering rollers; and
   the shut-off valve, in the second position, configured to allow the commodity to move from the commodity container to the first and second metering rollers.

10. The work vehicle of claim 9, wherein the first roller is configured to rotate about a first axis of rotation to meter out the commodity from the commodity container;
    wherein the second roller is configured to rotate about a second axis of rotation to meter out the commodity from the commodity container;
    wherein the shut-off valve is configured to rotate about a third axis of rotation when moving between the first position and the second position; and
    wherein the first, second and third axes of rotation are substantially parallel.

11. The work vehicle of claim 1, further comprising a control system configured to generate control signals for the plurality of actuators to selectively actuate individual ones of the plurality of metering rollers.

12. A work vehicle comprising:
    a commodity container;
    an actuator system with a first actuator, a second actuator, and a third actuator;
    a delivery system with at least one tube; and
    a metering system with at least one metering unit that includes a housing, a passage defined through the housing and configured to receive a commodity from the commodity container, and a first metering roller, a second metering roller, and a third metering roller at least partly disposed within the passage of the housing, the first metering roller configured to be driven in rotation by the first actuator for metering the commodity through the passage to the delivery system, the second metering roller configured to be driven in rotation by the second actuator for metering the commodity through the passage to the delivery system, and the third metering roller configured to be driven in rotation by the third actuator for metering the commodity through the passage to the delivery system;

wherein the first actuator and the first metering roller are aligned along a first axis of rotation, the second actuator and the second metering roller are aligned along a second axis of rotation, and the third actuator and the third metering roller are aligned along a third axis of rotation, the first axis of rotation, the second axis of rotation and third axis of rotation being spaced apart in parallel along a lateral axis, and the second axis of rotation being offset from the first axis of rotation and the third axis of rotation in a horizontal direction and in a vertical direction.

13. The work vehicle of claim 12, wherein the first axis of rotation of the first metering roller, the second axis of rotation of the second metering roller, the third axis of rotation of the third metering roller, and the at least one tube are substantially parallel.

14. The work vehicle of claim 12, wherein the metering system includes a plurality of metering units, the first metering roller of each of the plurality of metering units arranged in a first row, the second metering roller of each of the plurality of metering units arranged in a second row, the first row being spaced apart at a vertical distance, and the first row being offset from the second row at a horizontal distance.

15. The work vehicle of claim 12, wherein the at least one metering unit includes a shut-off valve having a first position and a second position;

the shut-off valve, in the first position, configured to prevent the commodity from moving from the commodity container through the passage to the first and second metering rollers; and the shut-off valve, in the second position, configured to allow the commodity to move from the commodity container through the passage to the first and second metering rollers.

16. The work vehicle of claim 12, wherein the at least one tube includes a plurality of tubes that are configured to commonly receive commodity metered out from the first metering roller.

17. The work vehicle of claim 12, wherein the at least one tube includes a plurality of tubes that are arranged substantially parallel to each other; and wherein the plurality of tubes are arranged substantially parallel to the first, second and third axes of rotation of the respective first, second and third metering rollers.

18. The work vehicle of claim 12, wherein the at least one tube includes a first tube and a second tube;

wherein the passage of the housing includes an inlet configured to receive the commodity from the commodity container for metering by the first metering roller and the second metering roller;

wherein the passage includes a first outlet configured to pass the commodity metered by the first metering roller to the first tube; and wherein the passage includes a second outlet configured to pass the commodity metered by the second metering roller to the second tube.

19. A work vehicle comprising:

a commodity container;

a metering system with a plurality of metering rollers arranged in a first row and a second row, the first row being spaced apart at a vertical distance from the second row, the first row being offset horizontally with respect to the second row;

an actuator system with a plurality of actuators configured to individually actuate respective ones of the plurality of metering rollers; and a delivery system with a plurality of tubes, each configured to receive a commodity metered from the commodity container by respective ones of the plurality of metering rollers, the plurality of tubes arranged in a third row and a fourth row, the third row being spaced apart at a vertical distance from the fourth row, the third row being offset horizontally with respect to the fourth row, the plurality of tubes being substantially parallel to the plurality of metering rollers;

wherein the plurality of metering rollers have axes of rotation arranged spaced apart along a lateral axis substantially parallel to each other and staggered in a vertical direction and in a horizontal direction.

* * * * *